United States Patent

[11] 3,593,658

[72] Inventor Auro Artom
Turin, Italy
[21] Appl. No. 840,132
[22] Filed July 1, 1969
[45] Patented July 20, 1971
[73] Assignee Cselt Centro Studi E Laboratori Telecomunicazioni S.p.S.
Turin, Italy
[32] Priority July 5, 1968
[33] Italy
[31] 52330 A/68

[54] HIGH-SPEED PRINTING SYSTEM WITH CONTINUOUSLY ROTATING FONT WHEEL

5 Claims, 8 Drawing Figs.

[52] U.S. Cl. .......... 101/93 C
[51] Int. Cl. .......... B41j 5/46
[50] Field of Search .......... 101/93 C

[56] References Cited

UNITED STATES PATENTS 3,158,090 11/1964 Wasserman .......... 101/93 C
3,463,081 8/1969 Levine .......... 101/93 C

*Primary Examiner*—Robert Peshock
*Assistant Examiner*—J. N. Eskovitz
*Attorney*—Karl F. Ross

ABSTRACT: A teleprinter responsive to binary code combinations includes a continuously rotating font wheel with 51 peripherally equispaced typefaces and, synchronized with it, a reference wheel with 51 peripherally spaced alphanumerical markings respectively assigned to these typefaces and with 9 nonalphanumerical markings interspersed with the former. A sensor generates counting pulses in response to successive markings and steps a binary counter whose setting is fed to a comparator also receiving code combinations or "words" stored in a register in response to incoming message signals. Upon detecting a match, the comparator trips a striker successively confronted by the typefaces of the font wheel, operation of this striker being inhibited during periods in which counting pulses are generated by nonalphanumerical markings.

INVENTOR:
AURO ARTOM
BY Karl G. Ross
ATTORNEY

| I | II | III | | | | | IV | V |
|---|---|---|---|---|---|---|---|---|
| A | — | 1 | 1 | 0 | 0 | 0 | 3 | 35 |
| B | ? | 1 | 0 | 0 | 1 | 1 | 25 | 57 |
| C | : | 0 | 1 | 1 | 1 | 0 | 14 | 46 |
| D | ✚ | 1 | 0 | 0 | 1 | 0 | 9 | 41 |
| E | 3 | 1 | 0 | 0 | 0 | 0 | 1 | 33 |
| F | ° | 1 | 0 | 1 | 1 | 0 | 13 | 45 |
| G | % | 0 | 1 | 0 | 1 | 1 | 26 | 58 |
| H | | 0 | 0 | 1 | 0 | 1 | 20 | 52 |
| I | 8 | 0 | 1 | 1 | 0 | 0 | 6 | 38 |
| J | ¶ | 1 | 1 | 0 | 1 | 0 | 11 | 43 |
| K | ( | 1 | 1 | 1 | 1 | 0 | 15 | 47 |
| L | ) | 0 | 1 | 0 | 0 | 1 | 18 | 50 |
| M | . | 0 | 0 | 1 | 1 | 1 | 28 | 60 |
| N | , | 0 | 0 | 1 | 1 | 0 | 12 | 44 |
| O | 9 | 0 | 0 | 0 | 1 | 1 | 24 | 56 |
| P | 0 | 0 | 1 | 1 | 0 | 1 | 22 | 54 |
| Q | 1 | 1 | 1 | 1 | 0 | 1 | 23 | 55 |
| R | 4 | 0 | 1 | 0 | 1 | 0 | 10 | 42 |
| S | ' | 1 | 0 | 1 | 0 | 0 | 5 | 37 |
| T | 5 | 0 | 0 | 0 | 0 | 1 | 16 | 48 |
| U | 7 | 1 | 1 | 1 | 0 | 0 | 7 | 39 |
| V | = | 0 | 1 | 1 | 1 | 1 | 30 | 62 |
| W | 2 | 1 | 1 | 0 | 0 | 1 | 19 | 51 |
| X | / | 1 | 0 | 1 | 1 | 1 | 29 | 61 |
| Y | 6 | 1 | 0 | 1 | 0 | 1 | 21 | 53 |
| Z | + | 1 | 0 | 0 | 0 | 1 | 17 | 49 |
| CRGE. RET. | | 0 | 0 | 0 | 1 | 0 | 8 | 40 |
| LINE FEED | | 0 | 1 | 0 | 0 | 0 | 2 | 34 |
| LTRS. | | 1 | 1 | 1 | 1 | 1 | 31 | 63 |
| FGRS. | | 1 | 1 | 0 | 1 | 1 | 27 | 59 |
| SPACE | | 0 | 0 | 1 | 0 | 0 | 4 | 36 |
| NOT USED | | 0 | 0 | 0 | 0 | 0 | 0 | 32 |

O

| X | | | | Y | |
|---|---|---|---|---|---|
| J | K | $Q_1$ | $Q_2$ | $Q_1$ | $Q_2$ |
| 0 | 0 | 0 | 1 | 0 | 1 |
| 0 | 0 | 1 | 0 | 1 | 0 |
| 0 | 1 | X | X | 0 | 1 |
| 1 | 0 | X | X | 1 | 0 |
| 1 | 1 | 0 | 1 | 1 | 0 |
| 1 | 1 | 1 | 0 | 0 | 1 |

INVENTOR:
AURO ARTOM
BY Karl F. Ross
ATTORNEY

INVENTOR:
AURO ARTOM
BY Karl F. Ross
ATTORNEY

INVENTOR.
AURO ARTOM
BY
Karl F. Ross
ATTORNEY

HIGH-SPEED PRINTING SYSTEM WITH CONTINUOUSLY ROTATING FONT WHEEL

My present invention relates to a high-speed printing system wherein a character-bearing font wheel continuously rotates past a printing position to align a succession of typefaces with a striker for printing the corresponding characters on a recording medium.

Such a floating type of printing mechanism, in which the striker is actuated at the precise instant when a selected character is in printing position, is widely used in communication systems in which the characters to be reproduced are received in binary form, usually as 5-bit code combinations or "words." This code allows for the selection of 32 different characters, which is generally insufficient; thus, two special code combinations (known as "letter shift" and "figure shift") are conventionally utilized for extending the number of selections to nearly twice that value. This enables the reproduction of all customary alphabetical and numerical characters, punctuation marks and other signs (e.g. arithmetical symbols); the total number of all these signs, referred to hereinafter as alphanumerical characters, is usually between 50 and 55. This leaves a number of unused code combinations which can be utilized to carry out ancillary operations such as character or line spacing and carriage return; no characters are to be printed during the performance of these operations in response to the corresponding code combinations.

The striker may be actuated by the output of a control circuit which counts the printing positions of the rotating font wheel and compares the corresponding code combinations with an incoming code signal temporarily stored in a register and, upon detecting a match, releases a command signal while concurrently clearing the register for the storage of the next code signal. Thus, a font wheel carrying all the alphanumerical characters in peripherally equispaced positions corresponding to the numerical values of the assigned code combinations, e.g. in ascending order of these values, would have to include a number of blank spaces if the arrival of a code signal should invariably actuate the print hammer or striker. This, however, requires a font wheel of larger diameter than would be needed if all its peripherally equispaced printing positions were occupied by alphanumerical characters. In the latter case, however, the striker would have to be prevented from operating in response to nonalphanumerical code signals, which heretofore involved rather complex circuitry.

The general object of my present invention, therefore, is to provide a printing system of this description in which the available printing positions on the periphery of a font or type wheel are all allotted to alphanumerical characters, thereby minimizing the diameter of that wheel and enabling consecutive printing cycles to follow one another in rapid succession, with positive inhibition of printing operations in response to nonalphanumerical characters effected by a simple electronic arrangement.

This object is realized, pursuant to my present invention, by the provision of a font or printing wheel and a reference or counting wheel coupled for synchronous rotation, the font wheel bearing a number of typefaces equispaced about its periphery whereas the reference wheel is provided with a larger number of peripheral markings; these markings include a set of equispaced markings, correlated with and individually assigned to the typefaces of the font wheel, and one or more supernumerary markings interleaved with the former. A sensor responding to these markings steps a binary counter which registers the number of both alphanumerical and nonalphanumerical positions traversed by the reference wheel, an operating cycle of that counter coinciding with a complete revolution of the two wheels. With the wheels rotating at constant speed, the output pulses of the sensor corresponding to alphanumerical characters have a predetermined cadence whereas the nonalphanumerical pulses occur at intervening times; to inhibit the actuation of the striker in wheel positions corresponding to nonalphanumerical code combinations it is therefore merely necessary to provide means for intermittently disabling its operating circuit in a rhythm related to the recurrence period of the operative wheel positions. Thus, if the wheels turn at $u$ revolutions per second and the number of operative positions (i.e. of alphanumerical characters) is $n$, the time interval between two alphanumerical markings is $T_1=(/u.n)$. When a *non* alphanumerical marking is interleaved, its time interval $T_2$ related to the preceding alphanumerical marking is $<(1/un)$. A suitable circuit actuated by alphanumerical markings inhibits the printing operation for a time $T_3$ longer than $T_2$ and shorter than $T_1$, so that the printing of non alphanumerical characters is inhibited.

The above and other features of my invention will be described in detail hereinafter with reference to the accompanying drawing in which:

FIG. 1 diagrammatically illustrates part of a counting mechanism for a printer according to my invention, including a reference wheel and a sensing device;

Figure 2:
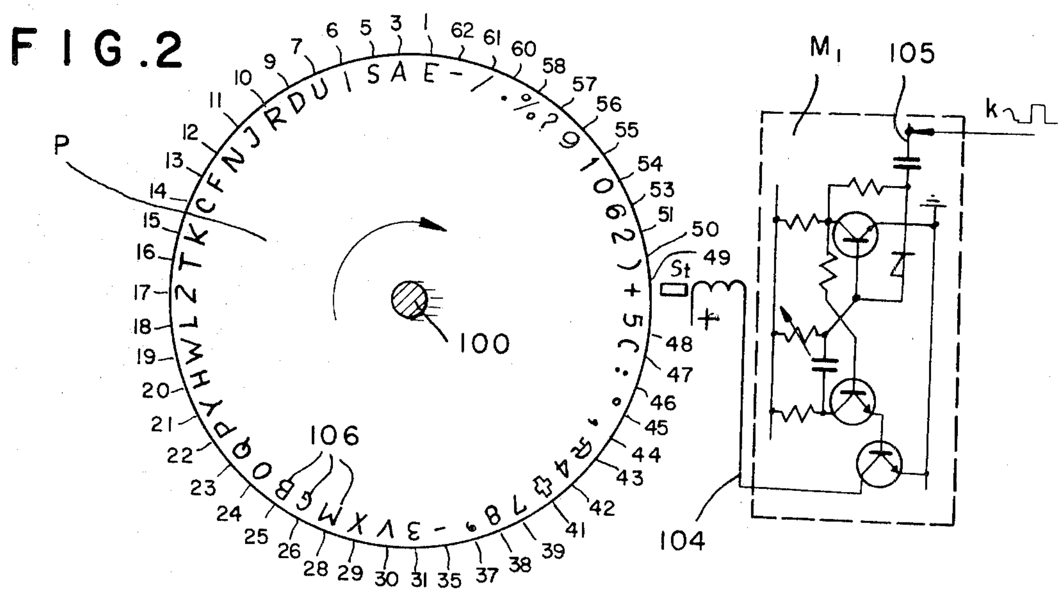
FIG. 2 is a similar view of a printing mechanism including a striker and a font wheel synchronized with the reference wheel of FIG. 1.
Figure 1:
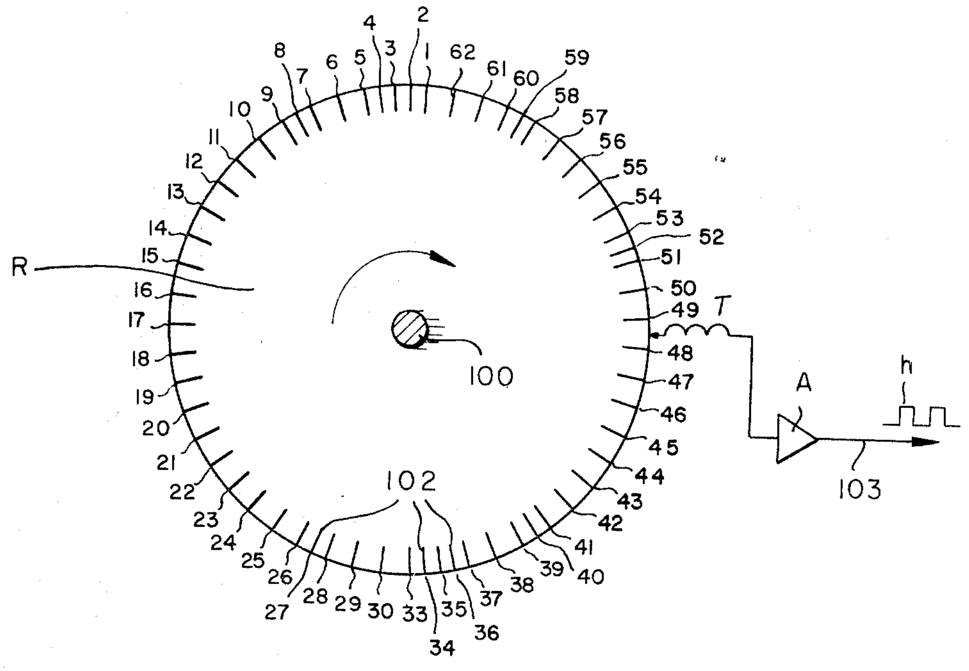
Figures 3, 4A, 4B:
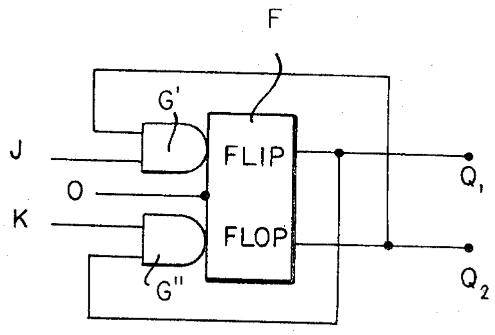
FIG. 3 is an explanatory table listing the alphanumerical and nonalphanumerical code combinations to be handled by the system.
Figure 5:
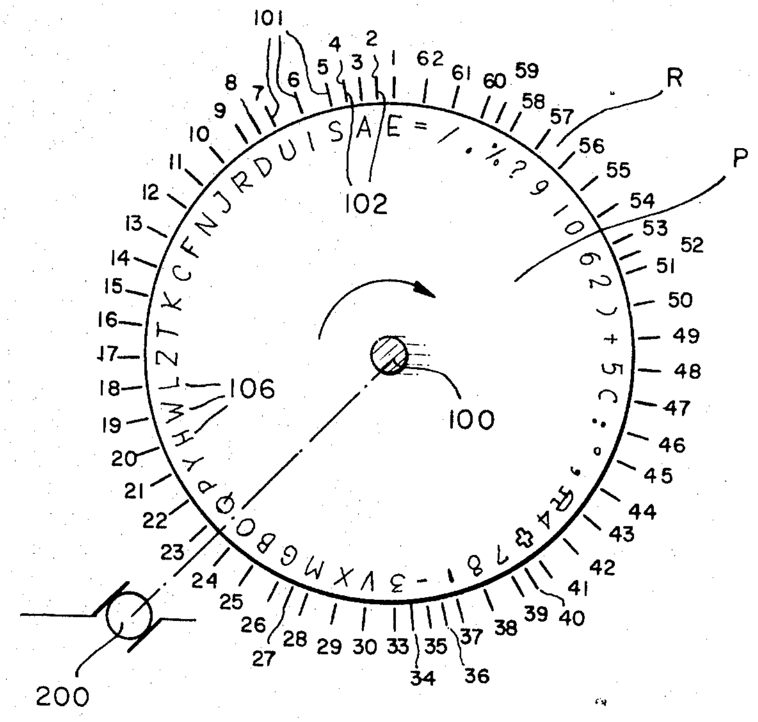
Figure 7:
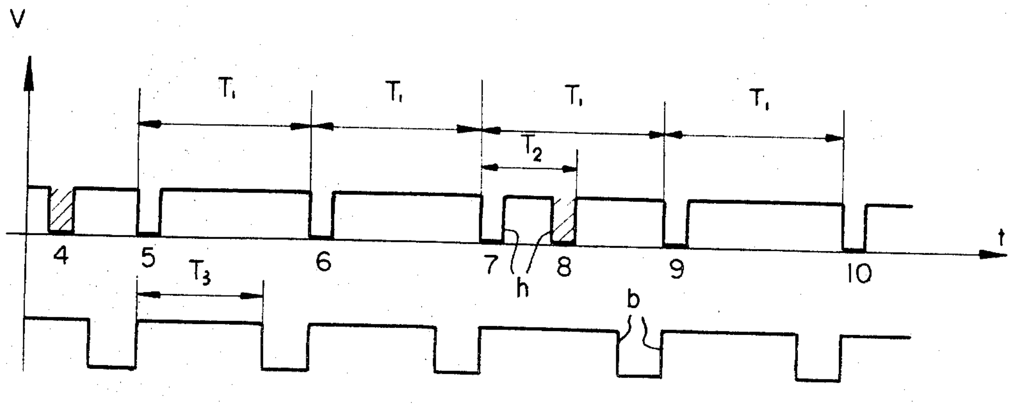
Figure 6:
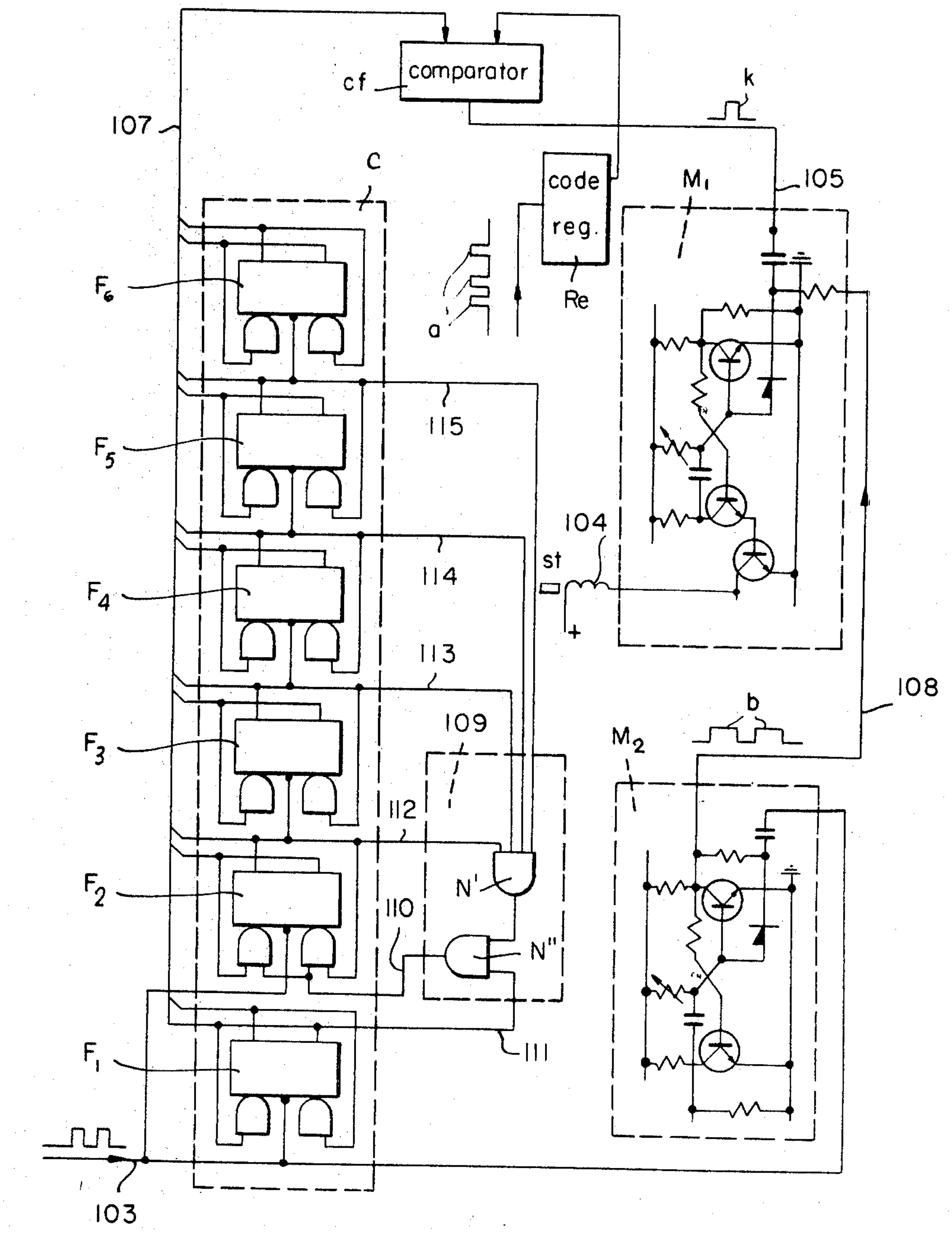

FIG. 4*a* is a schematic view of a counter stage forming part of the system;

FIG. 4*b* is a truth table relating to the logic of FIG. 4*a*;

FIG. 5 is a composite view of the two wheels shown in FIGS. 1 and 2;

FIG. 6 is a diagram of the circuitry controlling the operation of the printing mechanism of FIG. 2; and FIG. 7 is a timing diagram relating to the circuitry of FIG. 6.

In FIG. 1 I have shown a reference wheel R mounted on a shaft 100 for continuous rotation (here clockwise). A sensing head T, e.g. of the electromagnetic type, is juxtaposed with the periphery of that wheel and responds to markings 101, 102 distributed over that periphery, such as notches in a ferromagnetic body or ferromagnetic strips on a nonmagnetic background. The markings 101 are equispaced whereas the markings 102, which are fewer in number, are interleaved therewith. The two sets of markings 101, 102 are consecutively numbered, in ascending order as they pass the sensing position defined by pickup head T, from 1 through 62. Head T works into an amplifier A whose output lead 103 carries a train of counting pulses *h*.

FIG. 2 shows a printing wheel P juxtaposed with a striker S*t* actuatable by working pulses on the output lead of an operating circuit which includes a monostable multivibrator, or monoflop, $M_1$ responding to incoming trigger pulses *k* on a lead 105. Wheel P carries a multiplicity of typefaces 106 (indicated only diagrammatically) which are equispaced along its periphery in positions coinciding with the positions of the markings 101 on wheel R (FIG. 1) and have been numbered accordingly. Whenever one of the type faces 106 confronts the print hammer S*t*, its character is reproduced on a juxtaposed recording medium (not shown) if the print hammer is actuated at that precise instant.

In FIG. 3 I have indicated the relationship between the characters represented by typefaces 106 (FIG. 2), the operating positions of the two wheels P, R, and the code combinations received by a teleprinter which includes the mechanisms of FIGS. 1 and 2. Column I contains the alphabetical characters A—Z which are to be printed in response to 26 different code combinations occurring after a "letter shift" signal; column II includes the numerical characters and other symbols to be printed in response to the same code combinations after a "figure shift" signal. Column III shows the corresponding binary code combinations, here reproduced in the order of reception from left to right which is the reverse of their conventional algebraic representation. Column IV gives the decimal equivalents of the binary values of column III, whereas column V lists the same decimal equivalents augmented by the value 32; the latter addition is conventionally performed by an associated signal evaluator in response to a preceding "figure shift" code not canceled by a later "letter shift" code. The code system depicted in FIG. 3 is known as CCITT NO. 2.

Not all the code combinations or "words" assigned to alphanumerical characters need to be used for both "letters" and "figures"; in the code here shown, for example, no numerical counterpart exists for the letter "H" so that column II has a blank at position 43. Such a blank, of course, calls for inhibition of the printing operation, the same as the nonalphanumerical code combinations referred to above. The latter combinations are given in the last six rows of the table of FIG. 3 and correspond to "carriage return" (positions 8/40), "line feed" (positions 2/34), "letter shift" (positions 31/63), "-figure shift" (positions 27/59) and "space" (positions 4/36); positions 0/32 are not used.

Thus, the nonalphanumerical code combinations give rise to the same operating instructions whether preceded by "letter shift" (column I) or by "figure shift" (column II).

With the exception of the unutilized numbers 0 and 32, all the numerical values listed in columns IV and V are assigned to respective markings 101 or 102 on reference wheel R(FIG. 1), there being a total of 62 such markings. The number of alphanumerical markings 101, and therefore of typefaces 106 on wheel P(FIG. 1), is only 51, i.e. the sum of the 26 "letters" in column I and the 25 "figures" in column II.

FIG. 5 diagrammatically illustrates the juxtaposition of wheels P and R, without regard to their relative sizes (which could, but need not, be identical). It will be immediately apparent that the equispaced alphanumerical markings 101 register with the typefaces 106 whereas the nonalphanumerical markings 102 do not. Naturally, the illustrated geometrical alignment will occur only if the angular positions of sensing head T(FIG. 1) and striker S*t* (FIG. 2) are the same; in the more general case, a given alphanumerical marking 101 and the corresponding type face 106 have the same angular distance from respective reference position (e.g. "1" or "E"). A drive means for wheels P and R has been indicated diagrammatically as a motor 200.

The generation of trigger pulses *k* for the operating circuit $M_1$ of striker S*t* will now be described with reference to FIG. 6. This Figure shows a pulse counter C connected to lead 103 for receiving therefrom the counting pulses *h* generated by sensor T. Counter C has six binary stages constituted by respective flip-flops $F_1$—$F_6$, their basic construction being more clearly apparent from FIG. 4*a* which shows a generalized flip-flop F representing any of these stages. On FIG. 4*a* J and K are the inputs of the inhibiting signals, 0 is the input of the control signal $Q_1$ and $Q_2$ are the outputs.

The truth table given in FIG. 4*b* has a section X relating to the state of energization of leads J, K, $Q_1$, $Q_2$ prior to the application of a switching pulse to lead 0, another section Y showing the state of energization of leads $Q_1$, $Q_2$ after the pulse has been applied. Thus, an inhibition signal "0" applied concurrently to both control leads J, K prevents the flip-flop from being switched, as indicated by the two top rows of the truth table, whereas switching will occur if both control leads are energized by a finite potential "1" as indicated in the two bottom rows.

The counting pulses *h* from conductor 103 are applied concurrently to the common input terminals (0, FIG. 4*a*) of the two first stages $F_1$, $F_2$ of the counter C shown in FIG. 6. Except for stage $F_2$, described in detail hereinafter, each counter stage has the inputs J, K of its AND gates continuously energized, these inputs having been omitted in FIG. 6 for the sake of simplicity. The common input terminal of each stage $F_3$, $F_4$, $F_5$, $F_6$ receives its switching pulses from the "set" output of the immediately preceding stage. The potentials of these "set" outputs are concurrently transmitted, through a cable 107, to an input of a comparator C*f* whose other input receives a combination of potentials from corresponding stages of a six-stage register R*e* storing the incoming teleprinter signals as modified by the aforementioned evaluation circuit in accordance with a preceding "letter shift" or "figure shift" signal. If the two signal combinations match, comparator C*f* generates a trigger pulse *k* applied via its output lead 105 to monoflop $M_1$ to actuate the striker S*t* as previously described.

The counting pulses *h* are also applied to a second monoflop $M_2$ which measures a time interval slightly greater than half the time $(1/u.n)$, i.e. half the interval separating the sensing of any two consecutive alphanumerical markings 101. If the counter C is stepped by a nonalphanumerical marking 102 and a corresponding code combination is stored in register R*e*, a trigger pulse *k* will be generated but the monoflop $M_1$ will not respond thereto, being inhibited by the presence of a blocking signal *b* on a lead 108 emanating from monoflop $M_2$. This has been illustrated in FIG. 7 where voltage *v* has been plotted against time *t*. The counting pulses *h* corresponding to alphanumerical markings (positions 5, 6, 7, 9. 10) follow one another at uniform intervals $T_1$=$(1/u.n)$ where, as explained above, *u* is the number of wheel revolutions per second and *n* is the number of alphanumerical characters (here 51); counting pulses *h* generated by nonalphanumerical markings (positions 4 and 8) are separated from the preceding alphanumerical markings by intervals $T_2 \approx T_1/2$. The blocking signal *b*, lasting for a period $T_3$ substantially greater than half the interval $T_1$, thus prevents the untimely actuation of striker St. Since monoflop $M_2$ cannot be tripped while in its off-normal condition, the occurrence of a pulse *h* in one of the intermediate positions 4, 8 etc. will not extend the duration of the blocking signal *b*.

From FIGS. 1 and 5 it will be noted that no markings exist between positions 30, 62, on the one hand, and positions 33, 1, on the other hand. Since each of these positions is allotted to an alphanumerical character, their separation must be the same as that of any other pair of successive alphanumerical positions; this accounts for the suppression of positions 0 and 32. The nonalphanumerical code combination ("letter shift") assigned to positions 31 and 63 does not require a separate count if, in accordance with another feature of my invention, the counter C is directly stepped from position 30/62 to position 33/1. This is accomplished with the aid of a control circuit 109 including a pair of NAND gates N′, N″ which control the switching of stage $F_2$ through an output lead 110 connected to the input leads J, K (FIG. 4*a*) thereof. NAND gate N′ has four inputs 112, 113, 114, 115 tied to the "set" outputs of stages $F_2$, $F_3$, $F_4$ and $F_5$; this gate works into one input of NAND gate N″ whose other input 111 is tied to the "reset" output of stage $F_1$.

NAND gate N′ has a true output as long as at least one of its inputs is deenergized, i.e. if the count assumes any value from 1 through 29 or from 33 through 61. With flip-flop $F_1$ reset, lead 111 is energized so that an inhibiting signal appears on lead 110 to block the switching of stage $F_2$. When flip-flop $F_1$ is set, flip-flop $F_2$ is unblocked and responds to the same switching pulse *h* that next resets the stage $F_1$. If, however, NAND gate N′ is activated at count 30 (stage $F_6$ reset) or 62 (stage $F_6$ set), gate N″ has a true output regardless of the state of flip-flop $F_1$ so that flip-flop $F_2$ is also switched by the pulse *h* which sets the stage $F_1$. The concurrent switching of the two-lowest-order stages represents a jump by three units, with consequent skipping of readings 31, 32 or 63, 64.

It will thus be seen that I have provided a system which utilizes all the available printing positions of a font wheel and allows this wheel to be given the smallest dimensions compatible with the requisite number of typefaces, all without requiring complex circuitry to control the operation of print hammer S*t*. The inhibiting monoflop $M_2$ of FIG. 6 will be effective irrespectively of the number of "blank" or nonalphanumerical "words" provided by the code employed.

I claim:

1. A printing system for reproducing alphanumerical characters in response to incoming binary code combinations interleaved with code combinations of a nonalphanumerical nature, comprising:

a font wheel provided with a set of typefaces equispaced along its periphery, said typefaces corresponding to alphanumerical characters represented by respective code combinations;

a reference wheel coupled with said font wheel for synchronous rotation;

drive means for continuously rotating said wheels at substantially constant speed;

striker means adjacent said font wheel operable to print a character, represented by a confronting typeface, on a recording medium;

sensing means adjacent said reference wheel, the latter being provided with a set of markings equispaced along its periphery and with at least one further marking interposed between said equispaced markings, the number of said equispaced markings equaling the number of said typefaces, said sensing means being responsive to passage of any of said markings for generating a counting pulse;

a binary counter connected to said sensing means for stepping by said counting pulses, said counter having an operating cycle equal to a revolution of said wheels;

a binary register for temporarily storing incoming code combinations;

comparison means connected to receive readings from said counter and said register and for generating a trigger pulse upon detecting a match therebetween;

operating means for said striker means responsive to said trigger pulses;

and blocking means connected to said sensing means for producing inhibiting signals to disable said operating means for predetermined periods in response to counting pulses generated by said equispaced markings, the duration of said inhibiting signals being a major fraction of the intervals separating successive counting pulses due to said equispaced markings whereby actuation of said printing means in response to said interposed marking, representing a nonalphanumerical code combination, is prevented.

2. The combination defined in claim 1 wherein said counter comprises a plurality of bistable stages, further comprising control means responsive to a predetermined setting of said counter for conditioning two of said stages for simultaneous switching by a counting pulse whereby the counter skips several code combinations not assigned to alphanumerical characters.

3. The combination defined in claim 2 wherein the higher one of said two stages comprises a flip-flop with setting and resetting inputs, said control means including logical circuitry connected to receive the output of the lower one of said two stages for deriving therefrom a switching signal applied to said inputs.

4. The combination defined in claim 3 wherein said two stages are the first and second stages of the counter.

5. The combination defined in claim 4 wherein said counter has six stages, said logical circuitry including gate means connected to receive the outputs of the second, third, fourth and fifth stages for jointly switching said first and second stages in a set state of the second through fifth stages.